(12) United States Patent
Misada et al.

(10) Patent No.: US 8,517,879 B2
(45) Date of Patent: Aug. 27, 2013

(54) MULTI-STAGE REDUCTION GEAR

(75) Inventors: Yasuharu Misada, Nara (JP); Motoyasu Yamamori, Nagoya (JP); Tsune Kobayashi, Nukata-gun (JP); Yoshihiro Oono, Katsuragi (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 13/819,090

(22) PCT Filed: Aug. 30, 2011

(86) PCT No.: PCT/JP2011/069559
§ 371 (c)(1),
(2), (4) Date: Feb. 26, 2013

(87) PCT Pub. No.: WO2012/029756
PCT Pub. Date: Mar. 8, 2012

(65) Prior Publication Data
US 2013/0157795 A1    Jun. 20, 2013

(30) Foreign Application Priority Data
Aug. 31, 2010    (JP) .................................. 2010-194033

(51) Int. Cl.
*F16H 1/32*    (2006.01)
(52) U.S. Cl.
USPC ........................................................ 475/178

(58) Field of Classification Search
USPC .................................................. 475/162, 178
See application file for complete search history.

(56) References Cited

U.S. PATENT DOCUMENTS

| 3,037,400 A * | 6/1962 | Sundt ............................ 475/180 |
| 3,145,585 A * | 8/1964 | Brown ........................... 475/178 |
| 4,762,025 A * | 8/1988 | Lew ............................... 475/175 |

FOREIGN PATENT DOCUMENTS

| JP | 32 3218 | 4/1957 |
| JP | 62 200839 | 12/1987 |
| JP | 2006 329434 | 12/2006 |
| JP | 2010 65542 | 3/2010 |

OTHER PUBLICATIONS

International Search Report Issued Nov. 15, 2011 in PCT/JP11/69559 Filed Aug. 30, 2011.
International Preliminary Report on Patentability issued on Mar. 12, 2013, in PCT/JP2011/069559, filed on Aug. 30, 2011.

* cited by examiner

*Primary Examiner* — Edwin A Young
(74) *Attorney, Agent, or Firm* — Oblon, Spivak, McClelland, Maier & Neustadt, L.L.P.

(57) ABSTRACT

The multi-stage reducer includes a first-stage reduction part to which the rotation from a motor is input and a second-stage reduction part to which the rotation having undergone speed reduction by the first-stage reduction part is input. The second-stage reduction part is disposed on an outer circumference of the first-stage reduction part.

7 Claims, 5 Drawing Sheets

MULTI-STAGE REDUCTION GEAR

TECHNICAL FIELD

The present invention relates to a multi-stage reducer, and more specifically, to an offset oscillation reducer, which includes an internal gear and an external gear meshed therewith that cause the external gear to rotate in an offset manner.

BACKGROUND ART

A compact reducer with a large reduction ratio is necessary as a structure that turns a nacelle for a wind-power-generation wind turbine. For example, Patent Document 1 discloses a wind turbine driving apparatus which includes a first-stage reduction part and the second-stage reduction part, each of which comprises an epicyclic gear mechanism, coupled in series.

The first-stage reduction part is an offset reducer that includes a first-stage internal gear as a pin-like member, a first-stage external gear, a first-stage crank shaft, and a first-stage carrier, etc. The second-stage reduction part is an offset reducer that includes a second-stage internal gear as a pin-like member, a second-stage external gear, a second-stage center cluster shaft, a second-stage guide crank shaft, and a second-stage carrier, etc. According to such a wind turbine driving mechanism, the driving force by a motor is input into the first-stage reduction part, is subjected to speed reduction, input into the second-stage reduction part, and is subjected to further speed reduction.

The wind turbine driving mechanism disclosed in Patent Document 1 has the first-stage reduction part and the second-stage reduction part disposed over the axial lines of the crank shaft and the carrier, and coupled in series in order to obtain a large reduction ratio. However, since this wind turbine driving mechanism employs a structure having the first-stage reduction part and the second-stage reduction part disposed and coupled in series, the dimension in the axial direction is large, and is disadvantageous for downsizing of the whole device.

PRIOR ART DOCUMENT

Patent Document

Patent Document 1: Japanese Laid-Open Patent Publication No. 2010-65542

SUMMARY OF THE INVENTION

Problems that the Invention is to Solve

It is an object of the present invention to provide a multi-stage reducer that can obtain a large reduction ratio and also enables downsizing.

Means for Solving the Problems

To accomplish the above object, a first aspect of the present invention provides a multi-stage reducer that includes a plurality of reduction parts each including an input shaft to which a rotation from a drive source is input, a cam provided on the input shaft, an external gear, which is supported by an outer periphery of the cam and revolves around a rotation center of the input shaft, a carrier that is coupled with the external gear and is linked with a rotation movement of the external gear, and an internal gear that is meshed with the external gear and rotates around the rotation center of the input shaft, the multi-stage reducer being configured to reduce the rotation from the drive source at a predetermined reduction ratio based on a difference between a number of gear teeth of the external gear and a number of gear teeth of the internal gear and to output the rotation having undergone speed reduction from either one of the internal gear and the carrier. The multi-stage reducer includes: a first-stage reduction part to which the rotation from the drive source is input; and a second-stage reduction part to which the rotation having undergone speed reduction by the first-stage reduction part is input, and the second-stage reduction part is disposed on an outer circumference of the first-stage reduction part.

According to such a structure, the rotation from the drive source is subjected to speed reduction by the first-stage reduction part, and is further subjected to speed reduction by the second-stage reduction part. Hence, the rotation from the drive source is subjected to speed reduction by the plurality of reduction parts in this manner, and thus a large reduction ratio can be accomplished. Moreover, since the second-stage reduction part is disposed on the outer circumference of the first-stage reduction part, the dimension in the axial direction can be reduced in comparison with a conventional structure in which two reduction parts are disposed and coupled in series. Therefore, downsizing of the multi-stage reducer can also be accomplished.

In the above-explained multi-stage reducer, it is preferable that the first-stage reduction part should include a first input shaft, a first cam, a first external gear, a first carrier, and a first internal gear, the second-stage reduction part should include a second input shaft, a second cam, a second external gear, a second carrier, and a second internal gear, the second cam should be provided on an outer periphery of the first internal gear, and the first internal gear should be utilized as the second input shaft.

According to such a structure, the second cam is provided on the outer circumference of the first internal gear and the first internal gear is utilized as the second input shaft, and thus the first internal gear of the first-stage reduction part and the second input shaft of the second-stage reduction part can be used as a common component. Hence, the number of components of the multi-stage reducer can be reduced, thereby reducing the production costs.

In the above-explained multi-stage reducer, it is preferable that the second cam should be provided as a cylindrical surface offset from a rotation center of the first internal gear.

According to such a structure, the second cam provided as a cylindrical surface revolves around the rotation center of the first internal gear, and thus the second external gear supported by the outer periphery of the second cam can revolve around the rotation center of the first internal gear while being meshed with the second internal gear.

In the above-explained multi-stage reducer, it is preferable that a pair of the second cams should be provided on the first internal gear, and the pair of the second cams should be disposed at respective positions shifted by 180 degrees to a rotation center of the first internal gear.

According to such a structure, the pair of second cams are disposed so as to face with each other, and thus the rotation having undergone speed reduction by the first-stage reduction part can be output to the second-stage reduction part in a well-balanced manner. Accordingly, the power transmission from the first-stage reduction part to the second-stage reduction part can be performed smoothly.

In the above-explained multi-stage reducer, it is preferable that the second cam should have a dimension in an axial direction set to be larger than a dimension in the axial direction of the first cam.

In the multi-stage reducer, when power is transmitted from the first-stage reduction part to the second-stage reduction part, the rotation is subjected to speed reduction and thus torque increases. In this point, when the dimension in the axial direction of the second cam is set to be relatively large like the present invention, the power transmission from the first-stage reduction part to the second-stage reduction part can be performed smoothly and stably.

In the above-explained multi-stage reducer, it is preferable that the multi-stage reducer should include a housing that retains thereinside the plurality of reduction parts, the carrier should include a pin that fastens the external gear to the housing, and a number of the pins fastening the second external gear should be larger than a number of the pins fastening the first external gear.

According to such a structure, by setting the number of pins fastening the second external gear to be relatively large, the diameter of the pin disposed in the second external gear can be reduced. Accordingly, the outer diameter of the second external gear can be reduced, thereby realizing the downsizing of the whole multi-stage reducer.

In the above-explained multi-stage reducer, it is preferable that each reduction part should be configured to output the rotation input to the input shaft from the internal gear.

In each reduction part, the internal gear has a diameter larger than the diameter of the external gear, and the number of gear teeth of the internal gear is larger than the number of gear teeth of the external gear. In this point, by configuring the reduction part in such a way that the rotation input to the input shaft is output by the internal gear like the present invention, a large reduction ratio can be accomplished in comparison with a structure in which the rotation is output by a carrier coupled with the external gear.

MODES FOR CARRYING OUT THE INVENTION

An explanation will be given of an embodiment that realizes a two-stage reducer 1 as the multi-stage reducer of the present invention with reference to FIGS. 1 to 4. In the following explanation for the reducer 1 of the present invention, the side at a motor 4 illustrated in FIG. 1 is defined as the right, while the side at an output shaft 31 is defined as the left.

Figure 1:
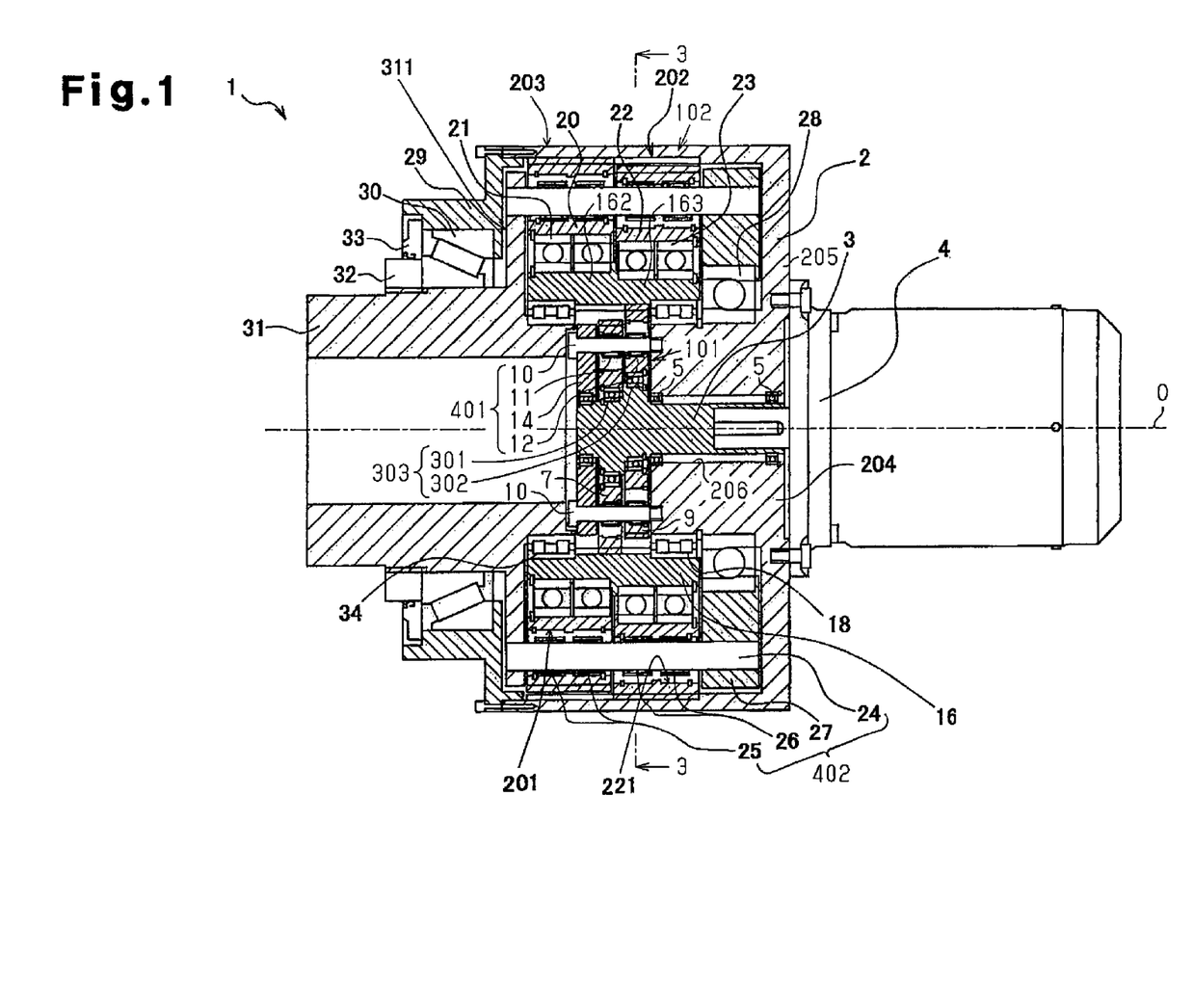
FIG. 1 is a cross-sectional view indicating an entire multi-stage reducer according to an embodiment of the present invention.
Figure 2:
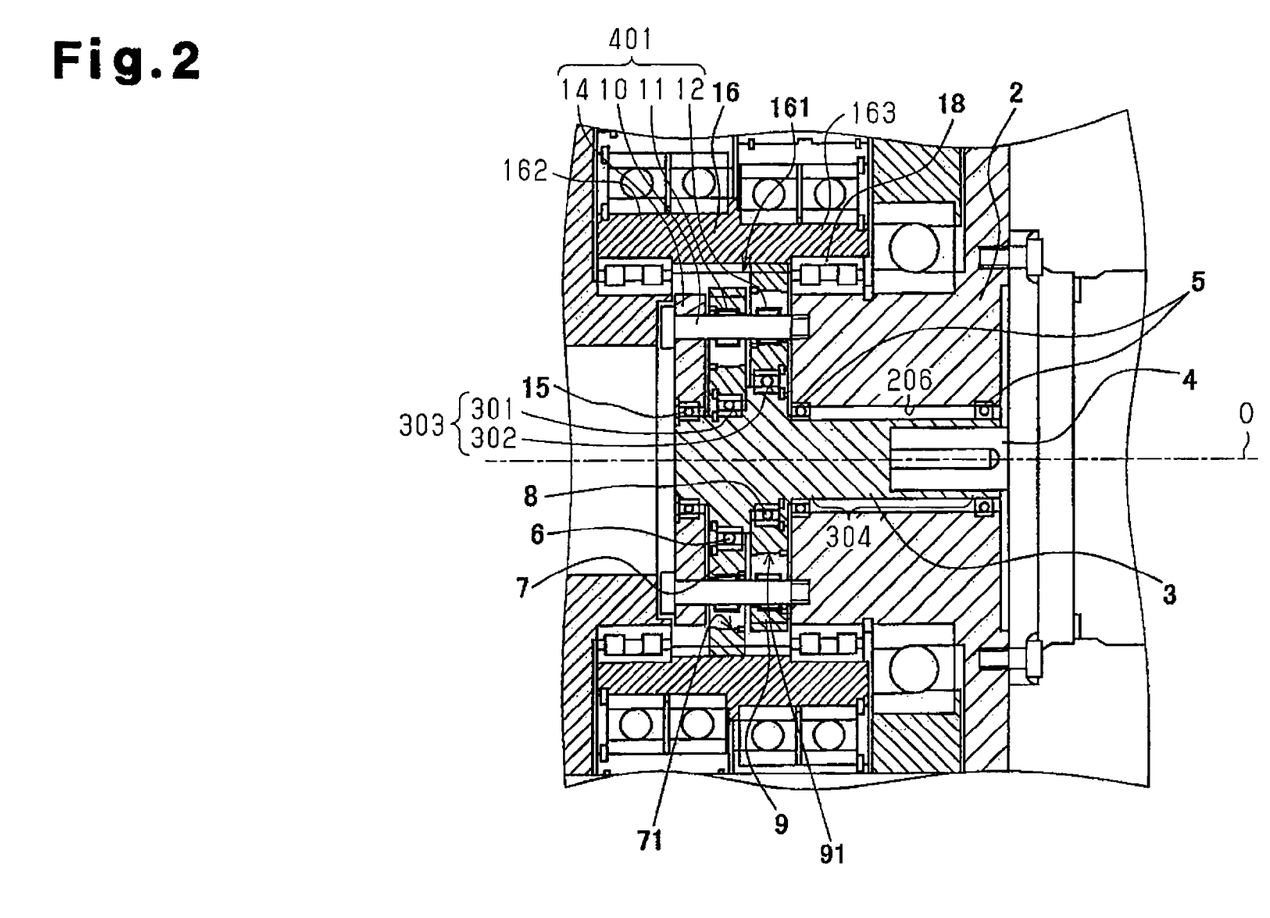
FIG. 2 is a partial cross-sectional view illustrating a first-stage reduction part in an enlarged manner.

As illustrated in FIGS. 1 and 2, the reducer 1 includes a housing 2 and a first-stage reduction part 101 and a second-stage reduction part 102 both retained in the housing 2. The first-stage reduction part 101 and the second-stage reduction part 102 are both offset oscillation reducers.

The housing 2 includes an internal annular part 204 disposed near the axial line of the housing 2, an external annular part 203 disposed so as to be apart from the axial line, and a flange part 205 having a substantially disc shape that couples the internal annular part 204 and the external annular part 203. Respective axial lines of the internal annular part 204, the external annular part 203, and the flange part 205 are coaxially disposed on the axial line of the housing 2.

The internal annular part 204 and the external annular part 203 extend to the left along the axial direction of the housing 2 from the circumferential edge of the flange part 205. The external annular part 203 has the dimension in the axial direction set to be longer than the dimension of the internal annular part 204 in the axial direction. The internal annular part 204 has a through-hole 206 provided in the center of the internal annular part 204 and running along the axial line of the housing 2.

A flange 29 is fastened to the open end of the external annular part 203. The flange 29 is formed in a ring shape having a cylindrical portion at the center thereof. An output shaft 31 is supported in a freely rotatable manner by the inner periphery of the flange 29 through a bearing 30. A male screw is formed on the outer periphery of the output shaft 31. By tightening a bearing stopper nut 32 engaged with the male screw of the output shaft 31, the bearing 30 is fastened to the flange 29. Moreover, a seal 33 is fastened between the outer periphery of the bearing stopper nut 32 and the inner periphery of the flange 29.

First, an explanation will be given of the structure of the first-stage reduction part 101 with reference to FIGS. 1 to 3.

Figure 3:
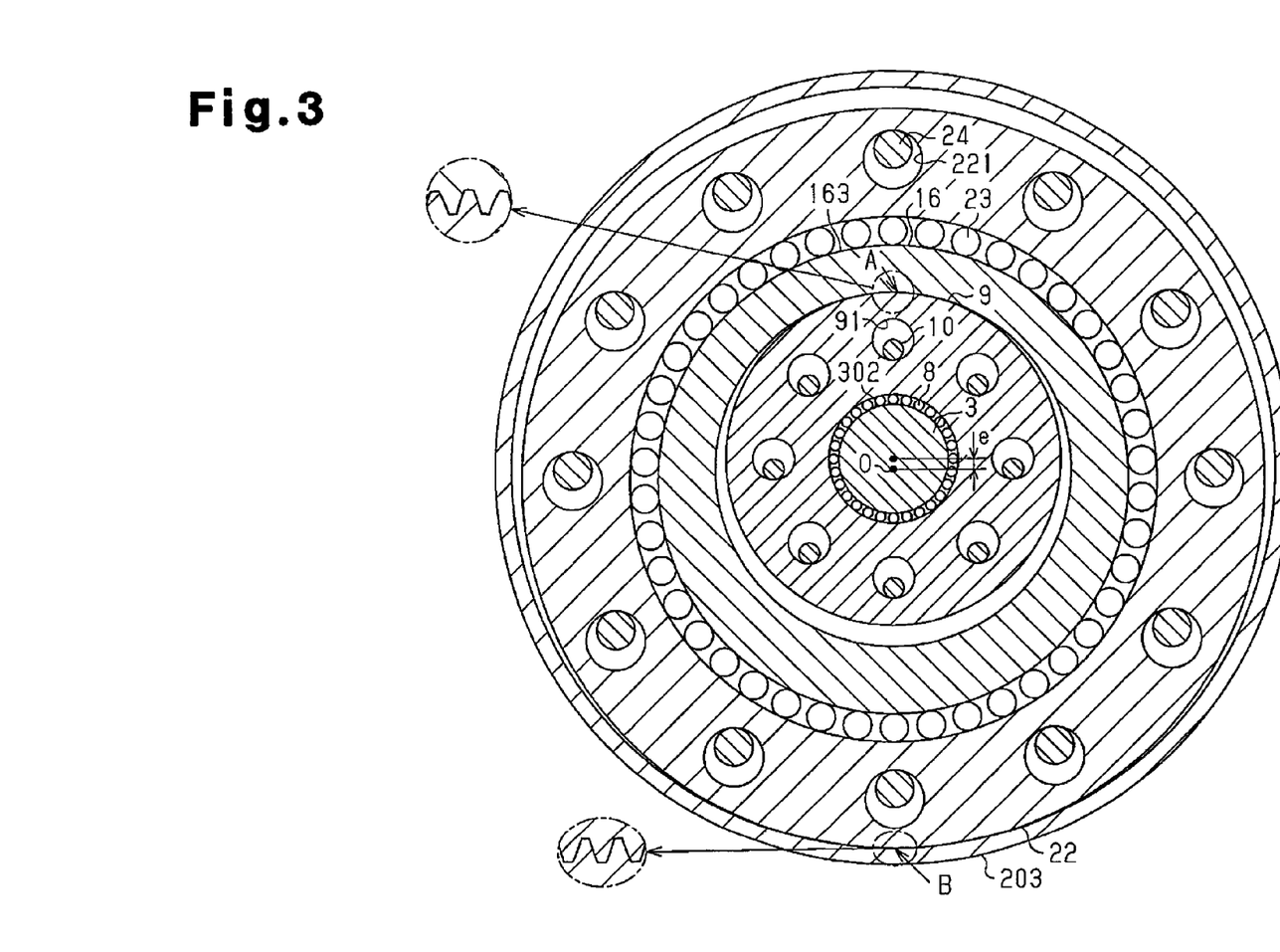
FIG. 3 is a cross-sectional view taken along a line 3-3 in FIG. 1.

As illustrated in FIGS. 1 to 3, the first-stage reduction part 101 includes a first crank shaft 3 as a first input shaft, first external gears 7 and 9, a plurality of fastener pins 10, and a first internal gear 16. The first crank shaft 3 includes a cam 303 and an insertion part 304 inserted in the through-hole 206 of the housing 2.

The cam 303 of the first crank shaft 3 is formed together with an offset cam 301 and an offset cam 302 both as a first cam provided as a cylindrical surface. The first crank shaft 3 is supported in a freely rotatable manner by the internal annular part 204 through a pair of bearings 5 fitted to both right and left ends of the insertion part 304. The first crank shaft 3 rotates around the axial line of the housing 2. The first crank shaft 3 has the right end coupled with a motor 4 as a drive source. The motor 4 is fastened to the external surface of the housing 2.

The offset cam 301 and the offset cam 302 are both formed as cylindrical surfaces offset from the axial line of the insertion part 304 of the first crank shaft 3, i.e., a rotation center O of the first crank shaft 3 by a distance e. Thus, when the first crank shaft 3 rotates, the offset cam 301 and the offset cam 302 revolve around the rotation center O of the first crank shaft 3 along the orbit of a circle offset by the distance e from the rotation center O. The offset cam 301 and the offset cam 302 are disposed at respective positions shifted by 180 degrees relative to the rotation center O of the first crank shaft 3.

The first external gear 7 is supported in a freely rotatable manner to the outer periphery of the offset cam 301 of the first crank shaft 3 through the bearing 6. The first external gear 9 is supported in a freely rotatable manner to the outer periphery of the offset cam 302 of the first crank shaft 3 through a bearing 8. Thus, when the first crank shaft 3 rotates, the first external gears 7 and 9 revolve around the rotation center O of the first crank shaft 3 along an orbit of the circle offset by the distance e from the rotation center O together with the offset cam 301 and the offset cam 302.

The first external gears 7 and 9 are formed with a plurality of circular holes 71 and 91, respectively. The respective holes 71, 91 are disposed around the axial line of the first external gears 7 and 9 at an equal angle and an equal interval. The holes 71 and 91 of the first external gears 7 and 9 are disposed so as to substantially overlap with each other. A fastener pin 10 having a circular cross-section is fitted in each hole 71 and hole 91 of the external gears 7 and 9. Each fastener pin 10 is disposed so as to have the axial line thereof directed to the axial direction of the first crank shaft 3. The respective fastener pins 10 are disposed around the axial line of the housing 2 at an equal angle and an equal interval. A pair of bearings 11 and 12 are engaged with the outer periphery of the fastener pin 10 in a freely rotatable manner. Each hole 71, 91 has an internal diameter d set to satisfy a relationship $d=2 \cdot e+D$ where D is the external diameter of the bearing 11, 12.

A first annular carrier plate 14 is engaged with the left end of the first crank shaft 3. A bearing 15 is present between the inner periphery of the first carrier plate 14 and the outer periphery of the first crank shaft 3. The first carrier plate 14 is supported in a freely rotatable manner to the first crank shaft 3 through the bearing 15.

The fastener pin 10 has the right end fastened to the internal surface of the housing 2 located opposite to the motor 4. The fastener pin 10 also has the left end fastened to the first carrier plate 14. The fastener pin 10, the bearing 11, the bearing 12, and the first carrier plate 14 constructs a first carrier 401 of the first-stage reduction part 101. The first carrier 401 is configured to operate in association with the rotational movement of the first external gears 7 and 9.

The first internal gear 16 is disposed at the outer periphery portions of the first external gears 7 and 9. The first internal gear 16 is formed in a cylindrical shape running along the axial line of the housing 2. A bearing 18 is present between the right end of the first internal gear 16 and the internal annular part 204. Moreover, a bearing 34 is present between the left end of the first internal gear 16 and the output shaft 31. The first internal gear 16 is supported in a freely rotatable manner by the outer periphery of the internal annular part 204 and the outer periphery of the output shaft 31, respectively, through the pair of bearings 18 and 34. The first internal gear 16 rotates around the rotation center O of the first crank shaft 3.

The first internal gear 16 is disposed such that the inner periphery of the first internal gear 16 faces the respective outer peripheries of the first external gears 7 and 9. Internal gear teeth 161 are formed to have the inner periphery of the first internal gear 16 which mesh with the first external gears 7 and 9. The internal gear teeth 161 are provided at the center of the first internal gear 16 in the axial direction. The first external gears 7 and 9 have a pitch circle diameter set to cause the respective external gears to be meshed with the internal gear teeth 161 of the first internal gear 16 at one location. The mesh point of the first external gear 7 to the first internal gear 16 and the mesh point of the first external gear 9 to the first internal gear 16 are disposed at locations shifted by 180 degrees relative to the axial line of the first internal gear 16, i.e., the rotation center O of the first crank shaft 3.

The first external gears 7 and 9 respectively revolve along the orbit of a circle offset by the distance e from the rotation center O around the rotation center O of the first crank shaft 3 while being meshed with the internal gear teeth 161 of the first internal gear 16 together with the rotation of the first crank shaft 3. At this time, the first external gear 7 revolves while causing the inner periphery of the hole 71 to always abut the outer periphery of the bearing 11. The first external gear 9 also revolves while causing the inner periphery of the hole 91 to always abut the outer periphery of the bearing 12.

Next, an explanation will be given of the structure of the second-stage reduction part 102 with reference to FIGS. 1 to 3.

As illustrated in FIGS. 1 to 3, the second-stage reduction part 102 includes the first internal gear 16 serving as a second input shaft, second external gears 20 and 22, a plurality of pins 24, and the housing 2 as a second internal gear. A second cam which is an offset cam 162 and an offset cam 163 is integrally formed on the outer periphery of the first internal gear 16.

The offset cam 162 and the offset cam 163 are respectively formed as a cylindrical surface offset by the distance e from the rotation center of the first internal gear 16, i.e., the rotation center O of the first crank shaft 3. Hence, when the first crank shaft 3 rotates, the offset cam 162 and the offset cam 163 respectively revolve around the rotation center O of the first crank shaft 3 along the orbit of a circle offset by the distance e from the rotation center O.

The offset cam 162 and the offset cam 163 are respectively disposed at locations shifted by 180 degrees relative to the rotation center O of the first crank shaft 3. The offset cam 162 and the offset cam 163 have a dimension in the axial direction set to be larger than the dimensions in the axial direction of the offset cam 301 and the offset cam 302.

The second external gear 20 is supported in a freely rotatable manner by the outer periphery of the offset cam 162 of the first internal gear 16 through a bearing 21. The second external gear 22 is supported in a freely rotatable manner by the outer periphery of the offset cam 163 through a bearing 23. Hence, when the first crank shaft 3 rotates, the second external gears 20 and 22 respectively revolve around the rotation center O of the first crank shaft 3 along the orbit of the circle offset by the distance e from the rotation center O together with the offset cam 162 and the offset cam 163. The second external gears 20 and 22 have a dimension in the axial direction set to be larger than the dimension in the axial direction of the first external gears 7 and 9.

A plurality of circular holes 201 and 221 are formed in the second external gears 20 and 22, respectively. The respective holes 201 and 221 are disposed around the axial lines of the second external gears 20 and 22 at an equal angle and an equal interval. Both holes 201 and 221 of the second external gears 20 and 22 are disposed so as to substantially overlap with each other. A pin 24 having a circular cross-section is fitted in each holes 201 and 221 of the second external gears 20 and 22. A pair of bearings 25 and 26 are engaged with the outer periphery of the pin 24 in a freely rotatable manner. The respective holes 201 and 221 have an internal diameter d2 set to satisfy a relationship $d2=2 \cdot e+D2$ where D2 is the external diameter of the bearing 25, 26.

A second carrier plate 27 having a disc shape is disposed between the housing 2 and the second external gear 22. A bearing 28 is present between the inner periphery of the second carrier plate 27 and the outer periphery of the internal annular part 204. Hence, the second carrier plate 27 is supported in a freely rotatable manner to the outer periphery of the internal annular part 204 through the bearing 28.

The pin 24 has the right end protruding from the hole 221 of the second external gear 22 and fastened to the second carrier plate 27. The pin 24 also has the left end protruding from the hole 201 of the second external gear 20 and fastened to a flange 311 of the output shaft 31. The pin 24, the bearing 25, the bearing 26, and the second carrier plate 27 construct a second carrier 402 of the second-stage reduction part 102. The second carrier 402 is configured to operate in association with the rotation movement of the second external gears 20 and 22.

The plurality of pins 24 are each fastened to the second carrier plate 27 and the output shaft 31 with the axial line of the pin 24 being directed to the axial direction of the first crank shaft 3. The respective pins 24 are disposed around the rotation center O of the first crank shaft 3 at an equal angle and an equal interval. The number of the pins 24 is set to be a larger number than that of the fastener pins 10. Each pin 24 has a cross-section formed in a circular shape with a larger diameter than that of the fastener pin 10.

The second-stage reduction part 102 is disposed at the outer circumference of the first-stage reduction part 101. That is, the housing 2 is disposed in such a way that the inner periphery of the external annular part 203 faces the outer periphery of the second external gears 20 and 22. Internal gear teeth 202, which mesh with the second external gears 20 and 22 are formed on the inner periphery of the external annular part 203 of the housing 2. The second external gears 20 and 22 have a pitch circle diameter set to cause the respective external gears to be meshed with the internal gear teeth 202 of the external annular part 203 at one location. The mesh point of the second external gear 20 to the external annular part 203 and the mesh point of the second external gear 22 to the external annular part 203 are respectively disposed at locations shifted by 180 degrees to the axial line of the housing 2. The second external gears 20 and 22 respectively revolve around the rotation center O of the first crank shaft 3 along the orbit of the circle offset by the distance e from the rotation center O while being meshed with the internal gear teeth 202 of the external annular part 203 together with the rotation of the first internal gear 16. At this time, the second external gear 20 revolves while causing the inner periphery of the hole 20 to always abut the outer periphery of the bearing 25. Moreover, the second external gear 22 revolves while causing the inner periphery of the hole 221 to always abut the outer periphery of the bearing 26.

Next, an explanation will be given of a transmission of a rotation in the reducer 1 with reference to FIG. 4.

Figure 4:
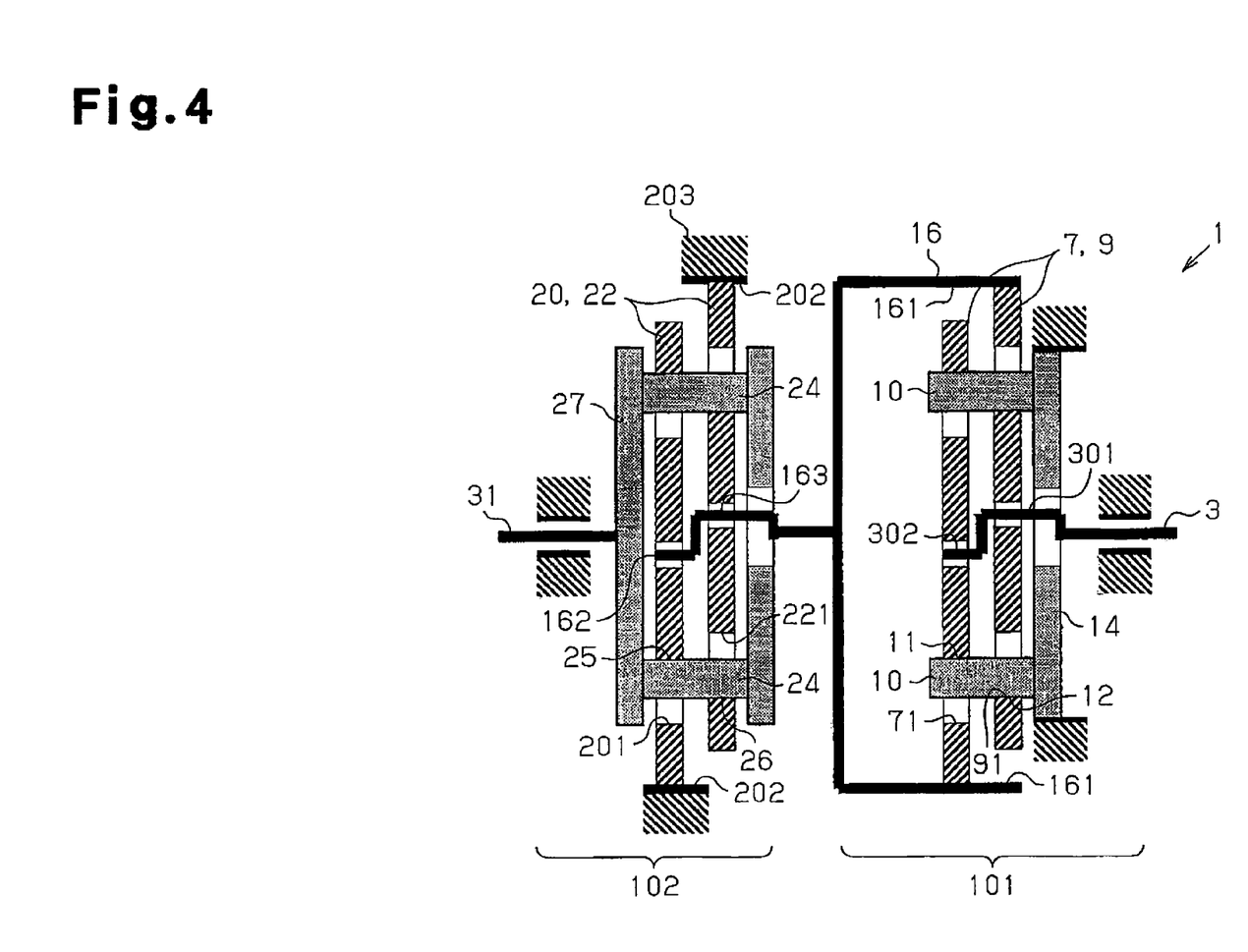
FIG. 4 is an exemplary diagram illustrating a transmission of a rotation in the multi-stage reducer.

As illustrated in FIG. 4, when the motor 4 rotates and the first crank shaft 3 rotates, the rotation by the motor 4 is transmitted to the first-stage reduction part 101 and the second-stage reduction part 102 in this order, and is output from the output shaft 31. When the first crank shaft 3 rotates, in the first-stage reduction part 101, the first external gears 7 and 9 respectively revolve around the rotation center O of the first crank shaft 3 while being meshed with the internal gear teeth 161 of the first internal gear 16. At this time, when the number of gear teeth of the first external gear 7, 9 is $Z_1$ and the number of internal gear teeth 161 is $Z_2$, the first external gears 7 and 9 and the first internal gear 16 relatively rotate by what corresponds to the number of gear teeth $Z_2-Z_1$ every time the first crank shaft 3 rotates.

Since the bearings 11 and 12 engaged with the fastener pins 10 abut the inner peripheries of the respective holes 71 and 91 of the first external gears 7 and 9, the first external gears 7 and 9 are unable to rotate around the axial lines of the first external gears 7 and 9. That is, since the rotation of the first external gears 7 and 9 are restricted by the fastener pins 10, the first internal gear 16 rotates around the axial line of the first internal gear 16 by what corresponds to the number of gear teeth $Z_2-Z_1$. In this manner, the rotation input from the motor 4 is subjected to speed reduction to a predetermined reduction ratio, and is transmitted from the first-stage reduction part 101 to the second-stage reduction part 102 during the procedure of transmitting the rotation from the first crank shaft 3 to the first internal gear 16. The reduction ratio at this time by the first-stage reduction part 101 is $Z_2/(Z_2-Z_1)$.

When the first internal gear 16 rotates, in the second-stage reduction part 102, the second external gears 20 and 22 supported by the outer peripheries of the cams 162 and 163 of the first internal gear 16 respectively revolve around the rotation center O of the first crank shaft 3 while being meshed with the internal gear teeth 202 of the external annular part 203. At this time, when the number of gear teeth of the second external gear 20, 22 is $Z_3$ and the number of internal gear teeth 202 of the external annular part 203 is $Z_4$, the second external gears 20 and 22 and the external annular part 203 relatively rotate by what corresponds to the number of gear teeth $Z_4-Z_3$ every time the first internal gear 16 rotates.

Since the external annular part 203 is formed together with the housing 2 and is unable to rotate, the second external gears 20 and 22 rotate around the axial line of the second external gears 20 and 22 by what corresponds to the number of gear teeth $Z_4-Z_3$. When the rotation of the second external gears 20 and 22 is transmitted to the pins 24 through the bearings 25 and 26, the pins 24 revolve around the rotation center O of the first crank shaft 3, and causes, together with the second carrier plate 27, the output shaft 31 to rotate around respective axial lines thereof. Hence, the rotation input from the first internal gear 16 is subjected to speed reduction to a predetermined reduction ratio, and is transmitted to the output shaft 31 from the second-stage reduction part 102 during the process of transmitting a rotation from the first internal gear 16 to the output shaft 31. The reduction ratio at by the second-stage reduction part 102 is $Z_3/(Z_4-Z_3)$.

According to the above-explained multi-stage reducer 1, the rotation by the first crank shaft 3 is subjected to speed reduction at the reduction ratio of $(Z_2-Z_1)/Z_2$ by the first-stage reduction part 101, and is further subjected to speed reduction at the reduction ratio of $(Z_4-Z_3)/Z_3$ by the second-stage reduction part 102. That is, the multi-stage reducer 1 is configured to reduce the rotation input to the first crank shaft 3 at the reduction ratio of $(Z_2-Z_1)\cdot(Z_4-Z_3)/(Z_2\cdot Z_3)$ by the first-stage and the second-stage reduction parts 101, 102, and outputs the reduced rotation from the output shaft 31. The second-stage reduction part 102 has the reduction ratio set to be larger than the reduction ratio of the first-stage reduction part 101.

According to the above-explained embodiment, the following advantages can be accomplished.

(1) The reducer 1 includes the first-stage reduction part 101 and the second-stage reduction part 102. The second-stage reduction part 102 is disposed at the outer circumference of the first-stage reduction part 101. According to this structure, the rotation by the motor 4 is subjected to speed reduction by the first-stage reduction part 101, and is further subjected to speed reduction by the second-stage reduction part 102. The rotation by the motor 4 is reduced in this manner by the plurality of reduction parts 101 and 102, and thus a large reduction ratio can be obtained. Moreover, since the second-stage reduction part 102 is disposed at the outer circumference of the first-stage reduction part 101, the dimension in the axial direction can be reduced in comparison with the prior-art structure having the two reducers disposed and coupled in series. Thus, the downsizing of the reducer 1 can be also accomplished.

(2) The second-stage reduction part 102 includes the first internal gear 16 that serves as the second input shaft. Formed integrally on the outer periphery of the first internal gear 16 are the offset cam 162 and the offset cam 163. According to this structure, the first internal gear 16 of the first-stage reduction part 101 and the second input shaft of the second-stage reduction part 102 can be the same component. Thus, the number of components constructing the reducer 1 can be reduced, thereby reducing the production costs.

(3) The offset cam 162 and the offset cam 163 are each formed as a cylindrical surface offset by the distance e from the rotation center of the first internal gear 16, i.e., the rotation center O of the first crank shaft 3. According to this structure, the offset cams 162 and 163 as the cylindrical surfaces can revolve around the rotation center of the first internal gear 16. Hence, the second external gears 20 and 22 supported on the outer peripheries of the offset cams 162 and 163 can revolve around the rotation center of the first internal gear 16 while being meshed with the internal gear teeth 202 of the external annular part 203 serving as the second internal gear.

(4) The offset cam 162 and the offset cam 163 are disposed at respective positions shifted by 180 degrees to the rotation center O of the first crank shaft 3. According to such a structure, the pair of offset cams 162 and 163 are disposed so as to face with each other, and thus the rotation having undergone speed reduction by the first-stage reduction part 101 can be output to the second-stage reduction part 102 in a well-balanced manner. Hence, the power transmission from the first-stage reduction part 101 to the second-stage reduction part 102 can be smoothly performed.

(5) According to the reducer 1, when power is transmitted from the first-stage reduction part 101 to the second-stage reduction part 102, the rotation is subjected to speed reduction, and thus torque increases. Regarding this operation, according to the present embodiment, the offset cam 162 and the offset cam 163 have a dimension in the axial direction set to be larger than the dimension in the axial direction of the offset cam 301 and the offset cam 302. Moreover, the second external gears 20 and 22 have a dimension in the axial direction set to be larger than the dimension in the axial direction of the first external gears 7 and 9. Furthermore, the pin 24 has a cross-sectional shape that is a circular shape with a larger diameter than that of the fastener pin 10. By relatively increasing the dimensions of respective components of the second-stage reduction part 102, power transmission from the first-stage reduction part 101 to the second-stage reduction part 102 can be performed smoothly and stably.

(6) The number of pins 24 fastening the first external gears 7 and 9 is set to be a larger number than the number of fastener pins 10 fastening the second external gears 20 and 22. According to such a structure, by setting the number of pins 24 fastening the second external gears 20 and 22 to be relatively large, the diameter of each pin 24 disposed in the second external gears 20 and 22 can be small. Hence, the outer diameters of the second external gears 20 and 22 can be reduced, thereby enabling the downsizing of the whole reducer 1.

The above-explained embodiment can be modified as follows.

Figure 5:
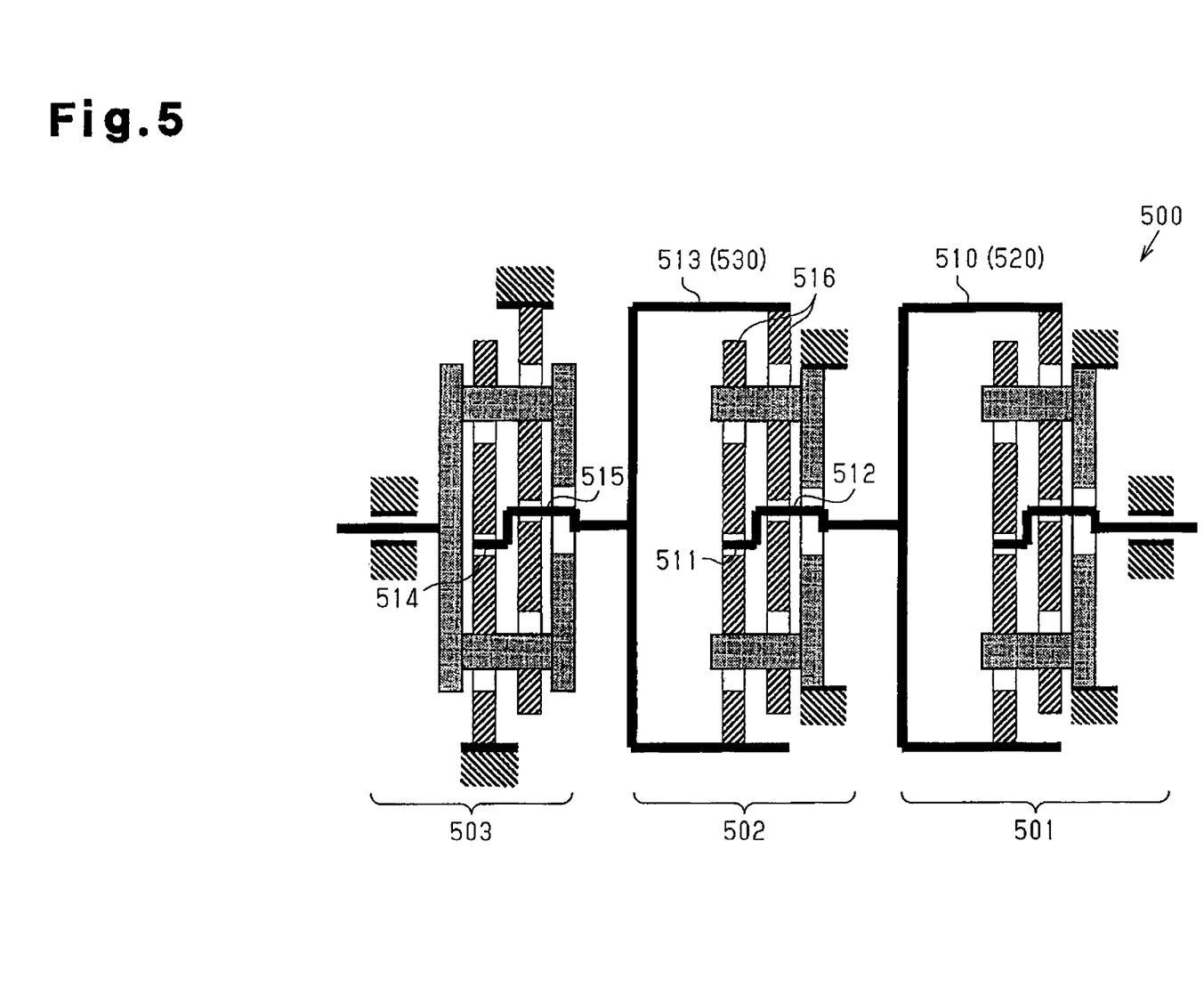
FIG. 5 is an exemplary diagram illustrating a transmission of a rotation in a multi-stage reducer according to another example.

In the present embodiment, a reducer 500 may include equal to or greater than three reduction parts each including an offset oscillation reducer. For example, as illustrated in FIG. 5, the reducer 500 includes a first-stage reduction part 501, an intermediate reduction part 502 as a second-stage reduction part, and a final-stage reduction part 503. Offset cams 511 and 512 are formed on the outer periphery of a first internal gear 510 constructing the first-stage reduction part 501. In the intermediate reduction part 502, the internal gear 510 of the first-stage reduction part 501 is utilized as an input shaft 520. Moreover, offset cams 514 and 515 are also formed on the outer periphery of a second internal gear 513 constructing the intermediate reduction part 502. In the final-stage reduction part 503, the internal gear 513 of the intermediate reduction part 502 is utilized as an input shaft 530. The intermediate reduction part 502 and the final-stage reduction part 503 are disposed on the outer circumference of the first-stage reduction part 501 and the outer circumference of the intermediate reduction part 502, respectively.

In the respective first-stage reduction part 501 and intermediate reduction part 502, the internal gear has a diameter set to be larger than the diameter of the external gear, and the number of gear teeth of the internal gear is set to be a larger number than the number of gear teeth of the external gear. Hence, as illustrated in FIG. 5, by configuring the intermediate reduction part 502 in such a way that the rotation input in the input shaft 520 is output by the internal gear 513, the reduction ratio can be increased in comparison with a structure in which the rotation is output by a carrier coupled with an external gear 516. More specifically, when the number of gear teeth of the external gear is $Z_1$ and the number of gear teeth of the internal gear is $Z_2$, since the internal gear has a larger diameter than that of the external gear and the respective numbers of gear teeth $Z_1$ and $Z_2$ of the external gear and the internal gear satisfy a relationship $Z_2 > Z_1$, a reduction ratio $Z_2/(Z_2-Z_1)$ when the internal gear is utilized as an output shaft can be larger than a gear ratio $Z_1/(Z_2-Z_1)$ when the carrier is utilized as an output shaft.

The invention claimed is:

1. A multi-stage reducer comprising a plurality of reduction parts each comprising an input shaft to which a rotation from a drive source is input, a cam provided on the input shaft, an external gear which is supported by an outer periphery of the cam and which revolves around a rotation center of the input shaft, a carrier which is coupled with the external gear and which is linked with a rotation movement of the external gear, and an internal gear which is meshed with the external gear and which rotates around the rotation center of the input shaft, the multi-stage reducer being configured to reduce the rotation from the drive source at a predetermined reduction ratio based on a difference between a number of gear teeth of the external gear and a number of gear teeth of the internal gear and to output the rotation having undergone speed reduction from either one of the internal gear and the carrier, wherein the plurality of reduction parts includes:
a first-stage reduction part to which the rotation from the drive source is input; and
a second-stage reduction part to which the rotation having undergone speed reduction by the first-stage reduction part is input, and
the second-stage reduction part is disposed on an outer circumference of the first-stage reduction part.

2. The multi-stage reducer according to claim 1, wherein the first-stage reduction part comprises a first input shaft, a first cam, a first external gear, a first carrier, and a first internal gear,
the second-stage reduction part comprises a second input shaft, a second cam, a second external gear, a second carrier, and a second internal gear,
the second cam is provided on an outer periphery of the first internal gear, and
the first internal gear is utilized as the second input shaft.

3. The multi-stage reducer according to claim 2, wherein the second cam is provided as a cylindrical surface offset from a rotation center of the first internal gear.

4. The multi-stage reducer according to claim 2, wherein a pair of the second cams are provided on the first internal gear, and
the pair of the second cams are disposed at respective positions shifted by 180 degrees to a rotation center of the first internal gear.

5. The multi-stage reducer according to claim 2, wherein the second cam has a dimension in an axial direction set to be larger than a dimension in the axial direction of the first cam.

6. The multi-stage reducer according to claim 1, further comprising a housing that retains thereinside the plurality of reduction parts, wherein
- the carrier comprises a pin that fastens the external gear to the housing, and
- a number of the pins fastening the second external gear is larger than a number of the pins fastening the first external gear.

7. The multi-stage reducer according to claim 1, wherein each reduction part is configured to output the rotation input to the input shaft from the internal gear.

* * * * *